Oct. 6, 1936.   J. A. LOGAN   2,056,791
FLUID SAMPLE HOLDER
Filed Oct. 17, 1934
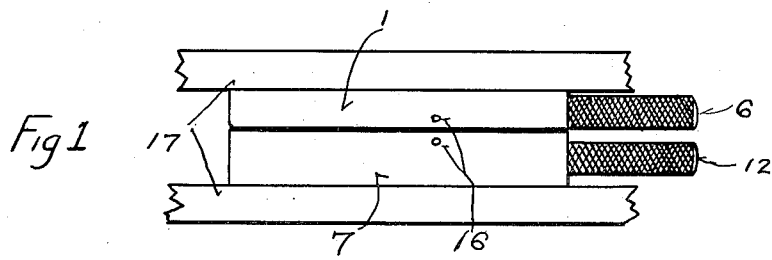
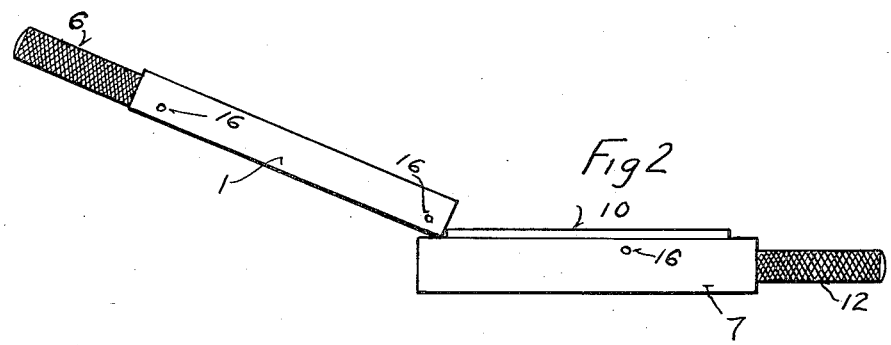
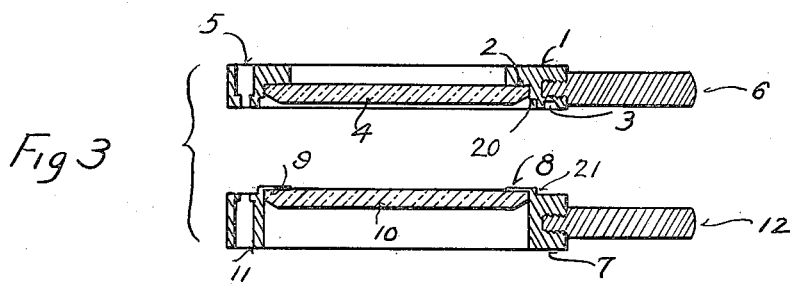
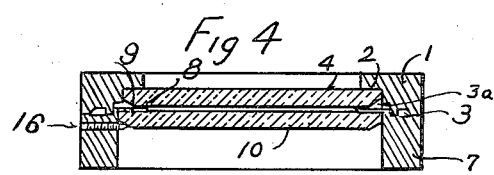
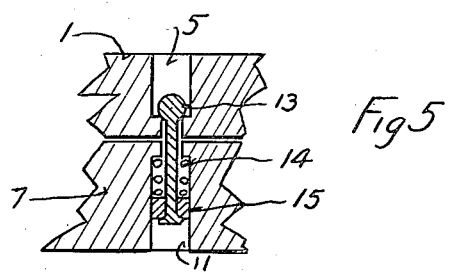
INVENTOR
BY  Joseph A Logan
Chapin + Neal
ATTORNEYS Patented Oct. 6, 1936

2,056,791

UNITED STATES PATENT OFFICE 2,056,791

FLUID SAMPLE HOLDER

Joseph A. Logan, Springfield, Mass., assignor to Gilbert & Barker Manufacturing Company, West Springfield, Mass., a corporation of Massachusetts Application October 17, 1934, Serial No. 748,683

4 Claims. (Cl. 88—14)

This invention relates to an improved fluid sample holder. It is used primarily in preparing and holding a fluid film to be tested in a testing instrument. One instrument for which the holder is particularly adapted is shown in my copending application Serial No. 728,055, filed May 29, 1934. Among other uses I contemplate the testing of oil films to determine how much the oil has been contaminated with dirt. And I contemplate the testing of milk with relation to its capacity as compared to predetermined standards.

The improved structure is shown in the accompanying drawing, in which—

Fig. 1 is a view of the sample holder in position between two rails of the testing instrument;

Fig. 2 is a side view with upper window frame swung back;

Fig. 3 is a section through the two frame parts and windows spaced apart, but with the pivot pin omitted;

Fig. 4 is a section of the holder in closed position taken in a plane at right angles to that of Fig. 3; and Fig. 5 is a detail section showing the pivot construction.

Referring to Fig. 3, the bottom frame 7 is circular so that a glass window 10 may enter from the bottom and rest against flange 8. A hole 11 is provided for the pivot pin. A handle piece 12 is attached opposite hole 11. The upper frame 1 has pivot hole 5 and handle 6. It has annular shoulder 2 to receive glass 4 and angular cut 20 to receive the flange 8 and its shoulder 21 in a telescoping accurate fit. Thus, the two frames, when brought from the position of Fig. 3 to the position of Fig. 4, fit together accurately with the glasses 4 and 10 spaced apart by the thickness of flange 8.

The glasses have their edges beveled as shown. They are held tightly in place by pointed screws 16 entering through the rim of the frame to press the glasses tightly against their shoulders. This is indicated in Fig. 4. It makes an easy way to hold the glasses in position and renew them when necessary.

The pivot assembly for the frame is seen in Fig. 5. A pivot pin with a ball head 13 is dropped into hole 5. The pin shank extends well into hole 11. A coiled spring 14 is put over the shank and its lower end provided with a ring 15 held in place by upsetting the end of the shank. With this assembly, frame 1 may pivot and lift up as permitted by the spring. It makes a loose jointed pivot connection in the nature of a universal joint. The advantage is that the spring will tend to snap the frames together in the general position of Fig. 4 when permitted to do so.

The advantage of the holder is in the speed and ease with which it can be handled. In open position a few drops of oil (or other fluid to be tested, like milk) are dropped on the face of window 10. Frame 1 is closed on frame 7 so window 4 rests on flange 8. In the closing the oil is spread over the film space between windows 4 and 10. Any excess is squeezed out into the space 3a or space 3. The former is provided by the bevel glass and the latter by an annular groove shown in the cross-section of Fig. 4. With this leeway it is a simple matter to put enough oil on window 10 to fill the test film space between the windows and take the excess in the overflow spaces without having the oil squeeze out between the frames at the sides.

The closing of the frames in easy fashion and yet in accurate condition for the testing instrument is brought about in this way. The loose pivot permits the frame 1 to swing from any out-of-the-way position to the approximate position of Fig. 4, and without any particular care. As soon as the frames register, spring 14 will pull the frames together at one side so the shoulder 20 will go down over shoulder 21, Fig. 3. Then the sample holder is shoved by handles 6 and 12 between two fixed rails 17 of the testing instrument. These rails being a fixed distance apart, will force the window frames tightly together. Their fit will not depend on the hinge construction or any clamp at the points opposite the hinge. Since the latter is deliberately made loose, the frames are free to squeeze tightly together, bearing with the same pressure all around their margins. This is brought about by permitting vertical straight-line movement of the frames so that they are squeezed into final position as they slide into position between rails 17.

After the test is made, the sample holder is pulled out by handles 6 and 12 and the frames separated. The loose pivot hinge means of Fig. 5 permits the frames to be manipulated for easy and convenient washing and wiping or other cleaning operations on the windows and frame parts. The holder is about the size of a large watch so as to be easily held in the operator's hand.

The structure disclosed is the result of study and experience in developing a most convenient sample holder for use with the testing instrument of my above mentioned copending application.

What I claim is:

1. A sample holder comprising a circular window frame having inwardly extending flange at one side with a right angle shoulder at its outer edge, a second circular window frame having a groove to fit accurately over said first mentioned flange to fit the frames for telescopic coaxial assembly, a window in the second mentioned frame adapted to rest on the first mentioned flange in said assembly, and a second window pressed flatly against the underside of said flange, whereby the thickness of the latter determines the accurate spacing of the windows when the frames are pressed together in their telescopic assembly.

2. The combination of claim 1 and a loose pivot for connecting said frames together when they are moved out of telescopic assembly.

3. A sample holder comprising two window frames, windows therein adapted to be spaced an accurate distance apart when the frames are pressed flatly together, a ball-headed pivot pin with the ball resting loosely in a socket in one frame and extending loosely into a recess of the other frame, and a spring in said recess and in engagement with said pivot pin tending to hold said ball head in its socket whereby the frames are pivoted for relative vertical and horizontal movements.

4. A portable sample holder for liquid film testing comprising two window frames having a telescopic fit one with the other for accurate alignment, a loose pivot connection between the frames for easy and wide separation, windows in said frames, means adjacent the edge portions of the windows to hold them parallel and an exact film distance apart as the frames are forced tightly together in their telescopic fit, the opposite faces of said frames being formed flat and adapted to be parallel for pressure operation on the holder as and when the frames are moved to film forming position.

JOSEPH A. LOGAN.

CERTIFICATE OF CORRECTION.

Patent No. 2,056,791.  October 6, 1936.

JOSEPH A. LOGAN.

It is hereby certified that error appears in the printed specification of the above numbered patent requiring correction as follows: Page 1, first column, line 10, for the word "capacity" read opacity; and that the said Letters Patent should be read with this correction therein that the same may conform to the record of the case in the Patent Office.

Signed and sealed this 15th day of December, A. D. 1936.

Henry Van Arsdale (Seal) Acting Commissioner of Patents.